(12) United States Patent
Ismail et al.

(10) Patent No.: US 11,158,140 B2
(45) Date of Patent: Oct. 26, 2021

(54) SIGNAL RESPONSE MONITORING FOR TURBINE ENGINES

(71) Applicant: General Electric Company, Schenectady, NY (US)

(72) Inventors: Mustapha Ismail, Foster City, CA (US); John Lewis Moulton, West Chester, OH (US); Jeremy David Seager, Cincinnati, OH (US); Jose Ruben Ramirez, Queretaro (MX); Gerardo Perez, Queretaro (MX); Rogelio Guzman-Sauceda, La Piedad (MX); Bernardo Ivan Pozos Badillo, Queretaro (MX)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 16/357,842

(22) Filed: Mar. 19, 2019

(65) Prior Publication Data

US 2020/0302705 A1 Sep. 24, 2020

(51) Int. Cl.
*G07C 5/08* (2006.01)
*F02C 3/06* (2006.01)
*F02C 9/00* (2006.01)

(52) U.S. Cl.
CPC .............. *G07C 5/08* (2013.01); *F02C 3/06* (2013.01); *F02C 9/00* (2013.01)

(58) Field of Classification Search
CPC ..... G07C 5/08; F02C 3/06; F02C 9/00; G05B 23/0291; G05B 23/0297; G05B 23/0235; G05B 23/054; G05B 9/03; F23N 2241/20
See application file for complete search history.

(56) References Cited

U.S. PATENT DOCUMENTS 5,157,918 A 10/1992 Maulat
5,680,310 A 10/1997 Morgan et al.
(Continued)

FOREIGN PATENT DOCUMENTS

EP 1452936 A2 9/2004
EP 3246547 A1 11/2017

OTHER PUBLICATIONS

European Search Report Corresponding to Application No. 20162004 dated Jun. 16, 2020.

*Primary Examiner* — Marthe Y Marc-Coleman
(74) *Attorney, Agent, or Firm* — Dority & Manning, P.A.

(57) ABSTRACT

A turbomachine control system that includes signal monitoring features is provided. Particularly, the control system proactively isolates or discards unresponsive sensed signals to prevent them from being used to control the turbomachine. The control system can detect and discard unresponsive signals and can utilize a healthier signal or a model of the expected sensor response instead to avert undesirable events, such as e.g., a loss of thrust control event. In one example aspect, the control system includes one or more computing devices that receive a sensed signal. The variance of the sensed signal is determined and then compared to an expected variance of the signal. The expected variance can be output by a sensor model of the one or more computing devices. A variance ratio is determined and the output is compared to a predefined threshold. If the output of the variance threshold exceeds the predefined threshold, then the signal is classified as unresponsive.

20 Claims, 7 Drawing Sheets

(56) References Cited

U.S. PATENT DOCUMENTS

| | | |
|---|---|---|
| 6,741,919 B1 | 5/2004 | Schuster et al. |
| 7,549,292 B2 | 6/2009 | Peck et al. |
| 7,764,188 B2 | 7/2010 | O'Neal et al. |
| 9,429,078 B1 | 8/2016 | Crowe et al. |
| 9,796,479 B2 | 10/2017 | Tucker et al. |
| 10,026,241 B1 | 7/2018 | Sankavaram et al. |
| 2002/0173897 A1* | 11/2002 | Leamy ............... F02C 9/28 701/100 |
| 2004/0193355 A1 | 9/2004 | Faymon et al. |
| 2012/0173078 A1 | 7/2012 | Everett et al. |
| 2018/0186469 A1 | 7/2018 | Gregory et al. |
| 2019/0128192 A1 | 5/2019 | Panov |
| 2019/0226354 A1* | 7/2019 | Karpman ............ F01D 21/14 |

* cited by examiner

SIGNAL RESPONSE MONITORING FOR TURBINE ENGINES

FIELD

The subject matter of the present disclosure relates generally to control systems for gas turbine engines, and more particularly, to control systems operable to proactively detect and isolate unresponsive sensed signals.

BACKGROUND

A gas turbine engine can include one or more sensors operable to sense various operating conditions or conditions at various stages or stations along the gas turbine engine during operation. For instance, the gas turbine engine can include one or more temperature or pressure sensors positioned along its core gas path. One or more computing devices of the gas turbine engine can receive sensed signals from the sensors, and based on such signals, the one or more computing devices can control the gas turbine engine to achieve the desired performance, fuel efficiency, thrust, etc.

In some instances, the sensed signals may become "unresponsive" within their valid electrical or functional ranges during operation. That is, one or more signals may be unresponsive at a steady valid value or the variance of the signals can exhibit a smaller-than-expected magnitude. Such unresponsive signals are not representative of the actual cycle gas path conditions. The unresponsiveness can be caused by a malfunction of the sensing system hardware or by an external factor that inhibits the sensing system from properly functioning. When these unresponsive signals go undetected, the use of these signals to control the engine can result in an unintended consequence, such as loss of thrust control or an engine shut down.

Conventionally, to isolate in-range failed signals, control systems of gas turbine engines have determined the absolute difference between the sensed signal and an expected signal (e.g., output by a sensor model). The determined absolute difference is then compared to a predefined threshold. If the absolute difference exceeds the predefined threshold, then the expected signal is selected for controlling the gas turbine engine. On the other hand, if the absolute difference does not exceed the predefined threshold, then the sensed signal is selected for controlling the gas turbine engine. While such conventional control schemes are capable of detecting failed signals inside of their validation ranges, such conventional control schemes are unable to detect unresponsive signals within their validation ranges. If such unresponsive signals are utilized in controlling the fuel control, variable geometry control, and/or bleed valves control aspects of the gas turbine engine, loss of thrust control events can occur, among other issues.

Accordingly, a turbine engine having a control system that addresses one or more of the challenges noted above would be useful. Moreover, a method for controlling an engine that addresses one or more of the challenges noted above would be beneficial.

BRIEF DESCRIPTION

Aspects and advantages of the invention will be set forth in part in the following description, or may be obvious from the description, or may be learned through practice of the invention.

In one aspect, a control system for detecting a sensor state of a sensor is provided. The control system includes a sensor and one or more computing devices communicatively coupled with the sensor and having one or more memory devices and one or more processing devices, the one or more memory devices storing computer-readable instructions that can be executed by the one or more processing devices to perform operations, in performing the operations, the one or more processing devices are configured to: receive, from the sensor, a signal indicative of a sensed parameter; determine a variance of the signal based at least in part on the received signal; determine the sensor state of the sensor by comparing the determined variance of the signal with an expected variance of the signal; and generate a control action in response to the determined sensor state.

In another aspect, a control system for a turbine engine is provided. The control system includes one or more computing devices having one or more memory devices and one or more processing devices, the one or more memory devices storing computer-readable instructions that can be executed by the one or more processing devices to perform operations, in performing the operations, the one or more processing devices are configured to: receive a signal indicative of an operating condition of the turbine engine; determine a variance of the signal based at least in part on the received signal; determine whether the signal is unresponsive by comparing the determined variance of the signal with an expected variance of the signal; and generate a control action in response to whether the signal is unresponsive, the control action associated with controlling the turbine engine.

In a further aspect, a method of detecting a sensor state of a sensor is provided. The method includes receiving, by one or more computing devices, a signal indicative of a sensed parameter from the sensor; determining, by the one or more computing devices, a variance of the signal based at least in part on the received signal; determining, by the one or more computing devices, the sensor state of the sensor by comparing the determined variance of the signal with an expected variance of the signal; and generating, by the one or more computing devices, a control action in response to the determined sensor state of the sensor.

In yet another aspect, a method for controlling a turbine engine is provided. The method includes receiving, by one or more computing devices, a signal indicative of an operating condition of the turbine engine. Further, the method includes determining, by the one or more computing devices, a variance of the signal based at least in part on the received signal. The method also includes determining, by the one or more computing devices, whether the signal is unresponsive by comparing the determined variance of the signal with an expected variance of the signal. Moreover, the method includes generating, by the one or more computing devices, a control action in response to whether the signal is unresponsive, the control action associated with controlling the turbine engine.

In yet another aspect, a method for controlling a turbomachine is provided. The method includes receiving, by one or more computing devices, a signal. Further, the method includes determining, by the one or more computing devices, a variance of the signal based at least in part on the received signal. In addition, the method includes determining, by the one or more computing devices, whether the signal is unresponsive by comparing the determined variance of the signal with an expected variance of the signal. The method further includes generating, by the one or more computing devices, an output indicative of whether the received signal is unresponsive.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
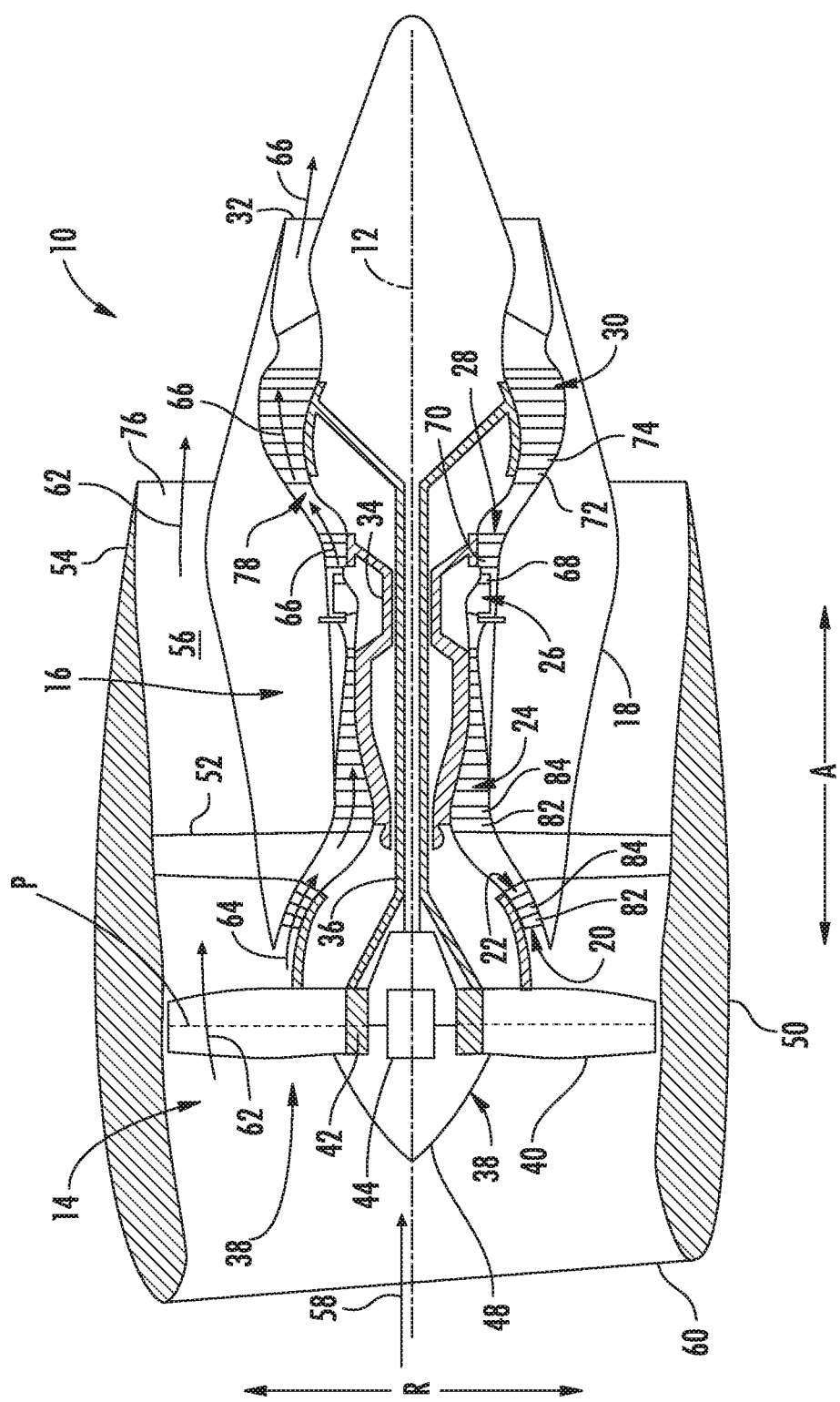
FIG. 1 provides a schematic cross-sectional view of a gas turbine engine in accordance with an example embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference. Furthermore, as used herein, terms of approximation, such as "approximately," "substantially," or "about," refer to being within a fifteen percent (15%) margin of error unless otherwise stated.

Furthermore, as used herein, the term "real time" refers to at least one of the time of occurrence of the associated events, the time of measurement and collection of predetermined data, the time to process the data, and the time of a system response to the events and the environment. In the embodiments described herein, these activities and events occur effectively instantaneously.

A control system for detecting a sensor state of a sensor and methods for detecting a sensor state are provided. For instance, the control system and methods herein can be used to detect the sensor state of a sensor of a machine. The machine can be a turbomachine, such as a gas turbine engine mounted to a vehicle (e.g., an aerial vehicle), for example. The control system can detect whether signals received from the sensor are responsive or unresponsive. Accordingly, the control system can detect whether the sensor is operating in an unresponsive state or a responsive state.

The control system includes signal monitoring features. Particularly, the control system includes one or more computing devices that proactively isolate unresponsive sensed signals to prevent them from being used by the control system, e.g., for controlling a turbomachine. An unresponsive signal can be, for example, a signal that remains at an essentially steady value or exhibits a slower than expected transient response. The control system can detect and discard unresponsive signals and can utilize a healthier signal or a sensor model to avert an undesirable event, such as e.g., a loss of thrust control event for an aviation gas turbine engine. Notably, the control system can detect and discard unresponsive signals even when such signals are within their validation ranges and without requiring unscheduled throttle adjustments.

In one example aspect, a control system for a turbine engine is provided. The control system includes one or more computing devices having one or more memory devices and one or more processing devices. The one or more memory devices store computer-readable instructions that can be executed by the one or more processing devices to perform operations. In performing the operations, the one or more processing devices are configured to receive a signal indicative of a sensed parameter (e.g., a sensed parameter indicative of an operating condition of the turbine engine). For instance, the signal can be indicative of the pressure or temperature at a particular station of the turbine engine. For example, the signal can be indicative of the compressor discharge pressure. The one or more processing devices are further configured to determine a variance of the signal based at least in part on the received signal. The variance of the received signal can be determined in any suitable manner.

Moreover, the one or more processing devices are configured to determine a model signal based at least in part on one or more other sensed parameters (e.g., other engine parameters and/or operating conditions of the turbine engine). For instance, a sensor model of the one or more computing devices can determine and output a model signal based at least in part on the one or more engine parameters and/or operating conditions of the turbine engine. Further, the one or more processing devices are further configured to determine an expected variance of the signal based at least in part on the determined model signal. The expected variance of the signal can be determined in any suitable manner.

With the variance of the received signal and the expected variance of the signal determined, the one or more processing devices are configured to determine the sensor state of the sensor by comparing the determined variance of the signal with the expected variance of the signal. For instance, a variance ratio can be determined based at least in part on the determined variance of the signal with the expected variance of the signal. The standard deviation of the signal can be amplified to ensure that there is ample margin against false detection of an unresponsive signal. The variance ratio can be compared to a predefined threshold. If the variance ratio does not exceed the predefined threshold, the signal is classified as responsive, and accordingly, the sensor state of the sensor is determined as being in the responsive state. If, on the other hand, the variance ratio exceeds the predefined threshold, the signal is classified as unresponsive, and thus, the sensor state of the sensor is determined as being in the unresponsive state.

The one or more processing devices can generate a control action in response to the determined sensor state. For instance, the control action can be a notification, a failure flag, discarding the received signal and using another signal, or some other output. By way of example, if the control system is used to control a turbine engine and if the signal is classified or deemed as responsive, the responsive signal can be used for controlling the turbine engine, e.g., controlling the fuel flow to the combustor to achieve a desired power or thrust output of the engine. If, in contrast, the signal is classified or deemed as unresponsive, the unresponsive signal can be discarded and a secondary control signal can used for controlling the turbine engine. The secondary control signal can be output from a sensor model or can be a signal from another sensor of the turbine engine. Methods for controlling turbine engines using such a control system are also provided.

The systems and methods described herein provide a number of technical effects, benefits, and improvements to control systems for machines and computing technology thereof In one aspect, as noted above, the control system can be operable to control an aviation gas turbine engine and can detect and discard unresponsive signals even when such signals are within their validation ranges and without requiring unscheduled throttle adjustments. Unscheduled throttle adjustments made to test signal accuracy is not desirable. In another aspect, the control system of the present disclosure does not rely on sensor model accuracy. That is, the control system of the present disclosure does not rely on whether the output of a sensor model actually represents the operating condition it is designed to model (e.g., temperature or pressure); rather the control system relies on a comparison of the power or variance of the received signal and the expected variance of the signal. Current models in the industry are accurate/reliable enough to predict or model a signal response and thus an expected variance of the signal given one or more inputs in real time. Accordingly, the control system takes advantage of the ability of current state-of-the-art models to accurately predict signal power and does not rely on the actual accuracy of the signal. For instance, the control system of the present disclosure does not rely on whether the sensor model accurately predicts the actual temperature of a particular station of the engine; rather, only the signal power or variance of the model signal is relied upon to determine whether the received signal is unresponsive. This is beneficial for a number of reasons, including: (1) models may not be accurate enough or representative of the field experience; (2) models typically do not capture the effect of engine deterioration; as engines in service accumulate more cycles, the sensor model and the sensor disagreement becomes more pronounced; and (3) other factors such as bleed air, horse power extraction, and stator rigging are typically not modeled and lead to sensor/model steady state disagreement.

In addition, in utilizing the control scheme of the present disclosure, computer-processing times may be significantly reduced and processing resources may be used for other core processing functions, among other benefits. Conventional control schemes rely on model accuracy and thus processing devices expend significant resources in predicting accurately modeled signals. As noted above, the control system described herein does not rely on such accuracy; rather the predicted power or expected variance of the signal is utilized for comparison with the determined variance of the received signal. This reduces the computing resources necessary to determine whether signals are unresponsive.

FIG. 1 provides a schematic cross-sectional view of a gas turbine engine in accordance with an example embodiment of the present disclosure. For the depicted embodiment of FIG. 1, the gas turbine engine is a high-bypass turbofan jet engine, referred to herein as "turbofan 10." The turbofan 10 can be mounted to an aerial vehicle, such as e.g., a fixed-wing aircraft. As shown in FIG. 1, the turbofan 10 defines an axial direction A, a radial direction R, and a circumferential direction. Moreover, the turbofan 10 defines an axial centerline or longitudinal axis 12 that extends therethrough for reference purposes. In general, the longitudinal axis 12 and the axial direction A extend parallel to one another, the radial direction R extends inward toward and outward from the longitudinal axis 12 orthogonal to the axial direction A, and the circumferential direction extends concentrically around the longitudinal axis 12.

The turbofan 10 includes a fan section 14 and a core turbine engine 16 disposed downstream of the fan section 14. The core turbine engine 16 includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustor section including a combustor 26; a turbine section including a high pressure turbine 28 and a low pressure turbine 30; and a jet exhaust nozzle section 32. A high pressure shaft or spool 34 drivingly connects the HP turbine 28 to the HP compressor 24. A low pressure shaft or spool 36 drivingly connects the LP turbine 30 to the LP compressor 22.

Each compressor 22, 24 can include a plurality of compressor elements. Particularly, for this embodiment, each compressor 22, 24 of the turbofan 10 includes a plurality of compressor stages, with each stage including both an annular array of stationary compressor vanes 82 and an annular array of rotating compressor blades 84 positioned immediately downstream of the compressor vanes 82. Additionally, the compressors 22, 24 can include one or more variable geometry components 86 (FIG. 2), including inlet guide vanes (IGVs), outlet guide vanes (OGVs), variable stator vanes, etc. Further, one or more bleed valves 88 (FIG. 2) can be positioned along the compressor 24 and/or compressor 22 and are operable to move open and closed such that pressurized air can be bled from the core air flowpath of the core engine 16. The bleed air bled through the bleed valves 88 can be routed to other engine systems, such as e.g., an active clearance control system for the HP turbine 28, or to various vehicle systems to which the engine is attached, such as e.g., a cabin air pressure system for pressurizing the cabin of an aircraft.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36.

Referring still to the exemplary embodiment of FIG. 1, the disk 42 is covered by rotatable spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 can be supported relative to the core turbine engine 16 by a plurality of circumferentially spaced outlet guide vanes 52. Moreover, a downstream section 54 of the nacelle 50 can extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustor 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units. Furthermore, in addition to turbomachines, the present subject matter is applicable to other types of machines/devices.

Figure 2:
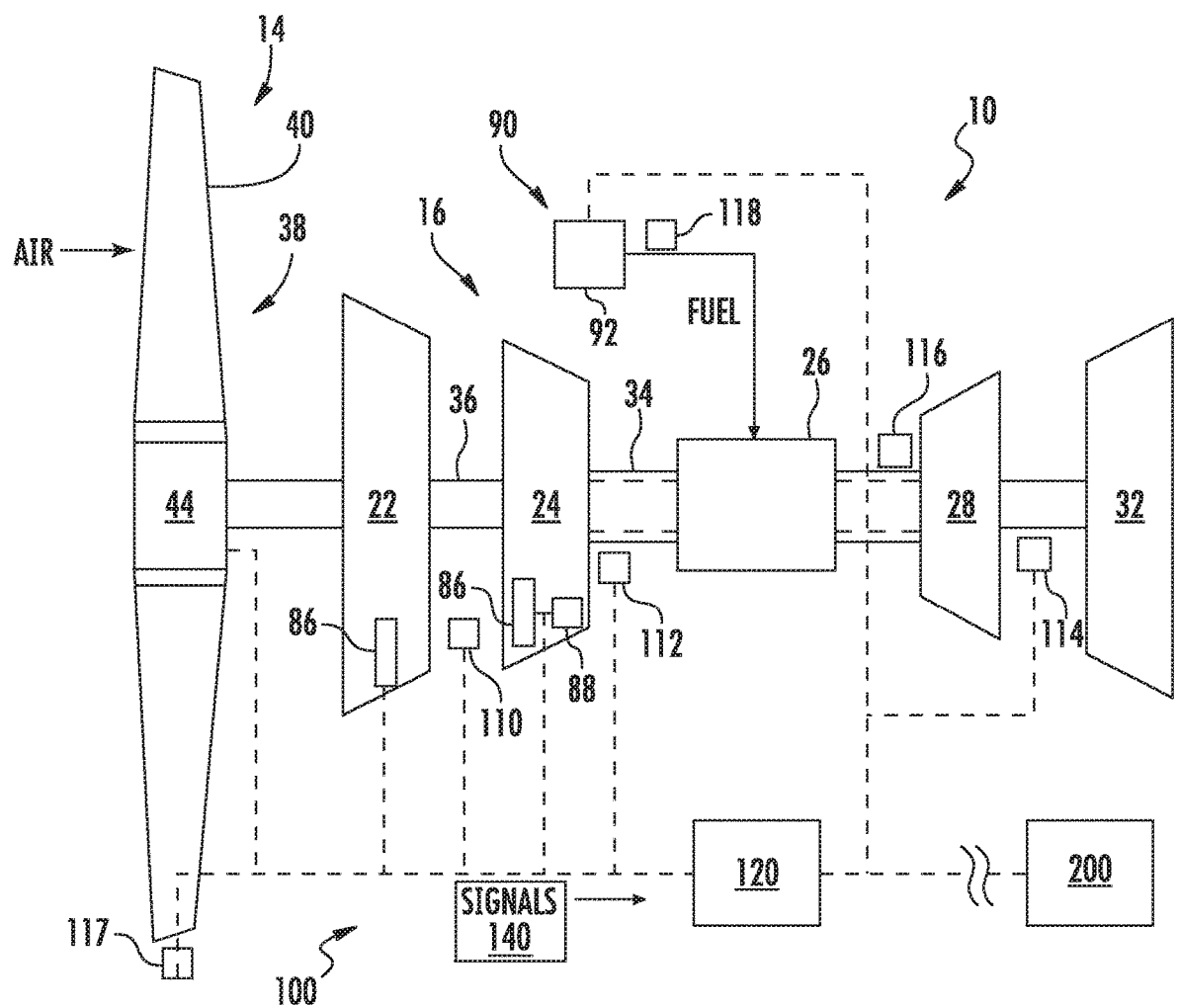
FIG. 2 provides a schematic view of the gas turbine engine of FIG. 1 and depicts a control system thereof.

FIG. 2 provides a schematic view of the turbofan 10 of FIG. 1 and depicts a control system 100 thereof. As shown, the turbofan 10 can include a number of sensors for sensing various operating conditions and parameters of the engine, e.g., during operation of the engine. For instance, the turbofan 10 can include, without limitation, one or more pressure sensors, temperature sensors, fuel flow sensors, vibration sensors, and/or speed sensors. For example, for the depicted embodiment of FIG. 2, the turbofan 10 includes a temperature sensor 110 operable to sense the inlet temperature of the fluid flowing into the HP compressor 24. The turbofan 10 also includes a pressure sensor 112 operable to sense the pressure of the fluid discharged from the HP compressor 24 (i.e., the compressor discharge pressure). Moreover, the turbofan 10 also includes an LP shaft speed sensor 114 operable to sense the rotational speed of the LP shaft 36. The turbofan 10 further includes an HP shaft speed sensor 116 operable to sense the rotational speed of the HP shaft 34. The turbofan 10 also includes a fan pressure sensor 117 operable to sense the pressure at the blade tips of the blades 40 of the fan 38. In addition, the turbofan 10 includes a fuel flow sensor 118 operable to sense the fuel flow of the fuel flowing to the combustor 26. Although not depicted, the turbofan 10 can also include one or more vibration sensors, e.g., operable to sense vibrations of one or more rotating components of turbofan 10. The sensors 110, 112, 114, 116, 117, 118 can be high bandwidth, high frequency sensors capable of reading their respective operating conditions on the order of two thousand times the update rate of one or more computing devices of the control system 100.

As further shown in FIG. 2, the control system 100 of the turbofan 10 includes one or more computing devices 120 for controlling operation of the turbofan 10. Specifically, the one or more computing devices 120 are configured to perform one or more operations or functions for controlling the turbofan 10, such as e.g., the signal monitoring operations described herein. In some embodiments, the one or more computing devices 120 can be a system of controllers or a single controller. In some embodiments, the one or more computing devices 120 can include an engine controller. The engine controller can be, for example, an Electronic Engine Controller (EEC) or an Electronic Control Unit (ECU). The engine controller can be operated as a control device of a Full Authority Digital Engine Control (FADEC) system of a vehicle, such as e.g., an aerial vehicle.

The one or more computing devices 120 are communicatively coupled with various components of the turbofan 10 as shown in FIG. 2 (e.g., via one or more suitable wired and/or wireless communication links). For this embodiment, the controller 120 is communicatively coupled with the sensors 110, 112, 114, 116, 117, 118, fuel metering device 92 of the fuel system 90, variable geometry components 86 of the LP and HP compressors 22, 24, as well as the actuation member 44 of the fan 38. In this way, one or more signals can be routed between the sensors 110, 112, 114, 116, 117, 118, fuel metering device 92 of the fuel system 90, variable geometry components 86 of the LP and HP compressors 22, 24, as well as the actuation member 44 of the fan 38 and the one or more computing devices 120. As will be appreciated the one or more computing devices 120 can be communicatively coupled with other components of the turbofan 10, to other computing systems or components of a vehicle to which the turbofan 10 is mounted, to various offboard or remote computing systems 200 or components (e.g., a ground system, a maintenance entity, an analytics entity, a remote pilot station, etc.), as well as other components or computing systems.

Figure 3:
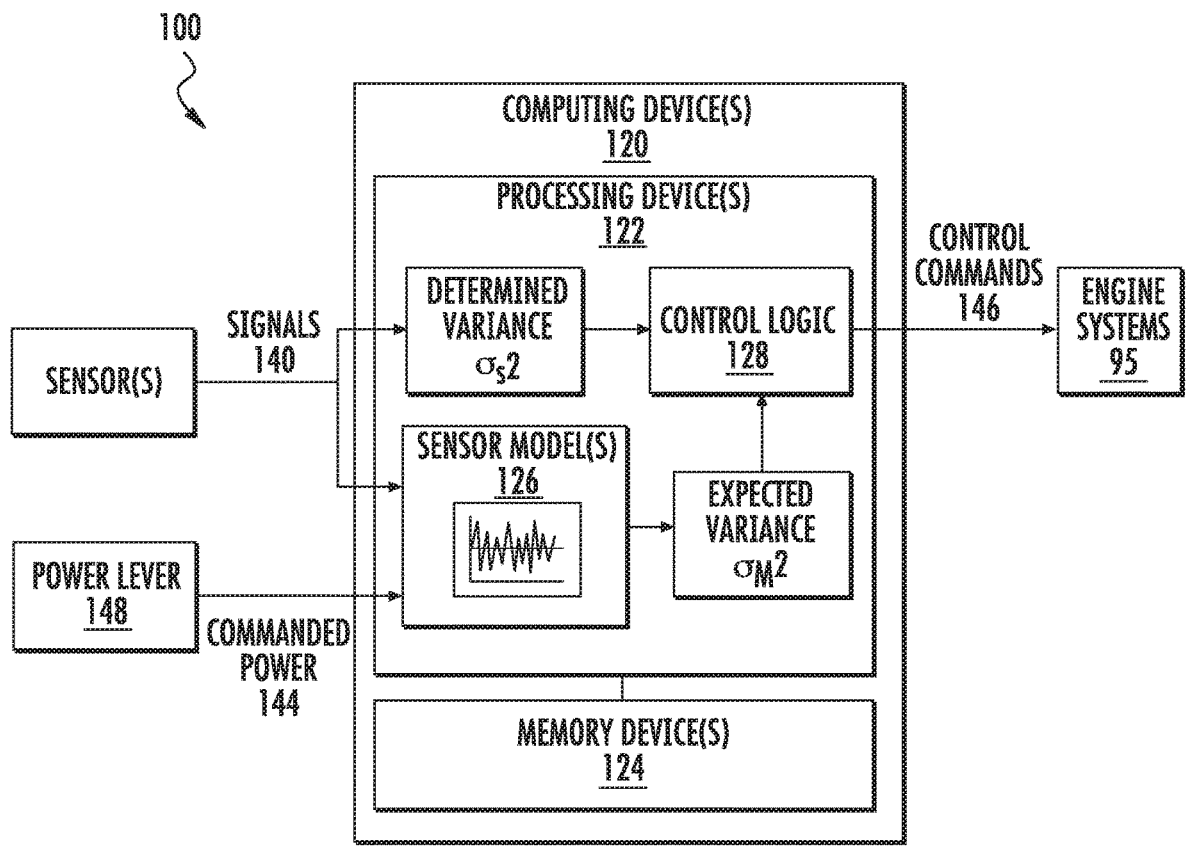
FIG. 3 provides a schematic view of the control system of FIG. 2.

FIG. 3 provides a schematic view of the control system 100 and depicts various models and control logic of the one or more computing devices 120. In FIG. 3, the one or more computing devices 120 are represented by a single computing device. As shown, the computing device 120 includes one or more processing devices 122 and one or more memory devices 124. The one or more memory devices 124 can store computer-readable instructions that can be executed by the one or more processing devices 122 to perform operations. The one or more computing devices 120 can be configured in substantially the same manner as one of the computing devices of the exemplary computing system 500 described below with reference to FIG. 8 and can be configured to perform one or more of the operations described herein, such as some or all of the operations of the method (400) described herein.

For signal response monitoring, the one or more processing devices 122 of the computing device 120 are configured to receive a signal indicative of an operating condition of the turbine engine. For instance, the one or more processing devices 122 can receive a signal from one of the sensors 110, 112, 114, 116, 117, 118 (FIG. 2). The operating condition can be, without limitation, pressure, temperature, rotational speed, vibration, and/or fuel flow. The signal 140 can be routed from one or more of the sensors 110, 112, 114, 116, 117, 118 to the computing device 120 via a suitable wired or wireless communication link. The signal can be routed to the computing device 120 continuously during operation of the turbofan 10. The signal can be routed as an analog and/or digital signal. For instance, FIG. 5 graphically depicts a signal S as a function of time that can be received by the computing device 120. The signal S depicted in FIG. 5 is an analog signal.

As depicted in FIG. 3, once the signal 140 is received by computing device 120, the one or more processing devices 122 of the computing device 120 are configured to determine a variance $(\sigma_S)^2$ of the received signal 140. The computing device 120 can include a filter (e.g., a first-order filter) operable to remove electrical noise from the received signal 140 that could mislead the variance value prior to or during calculating the variance of the signal 140. The variance $(\sigma_S)^2$ of the signal 140 can be determined or calculated in any suitable manner. For instance, the one or more processing devices 122 can first calculate the mean of the received signal 140, or the average amplitude of the signal 140 over time, e.g., a first period of time.

Figure 5:
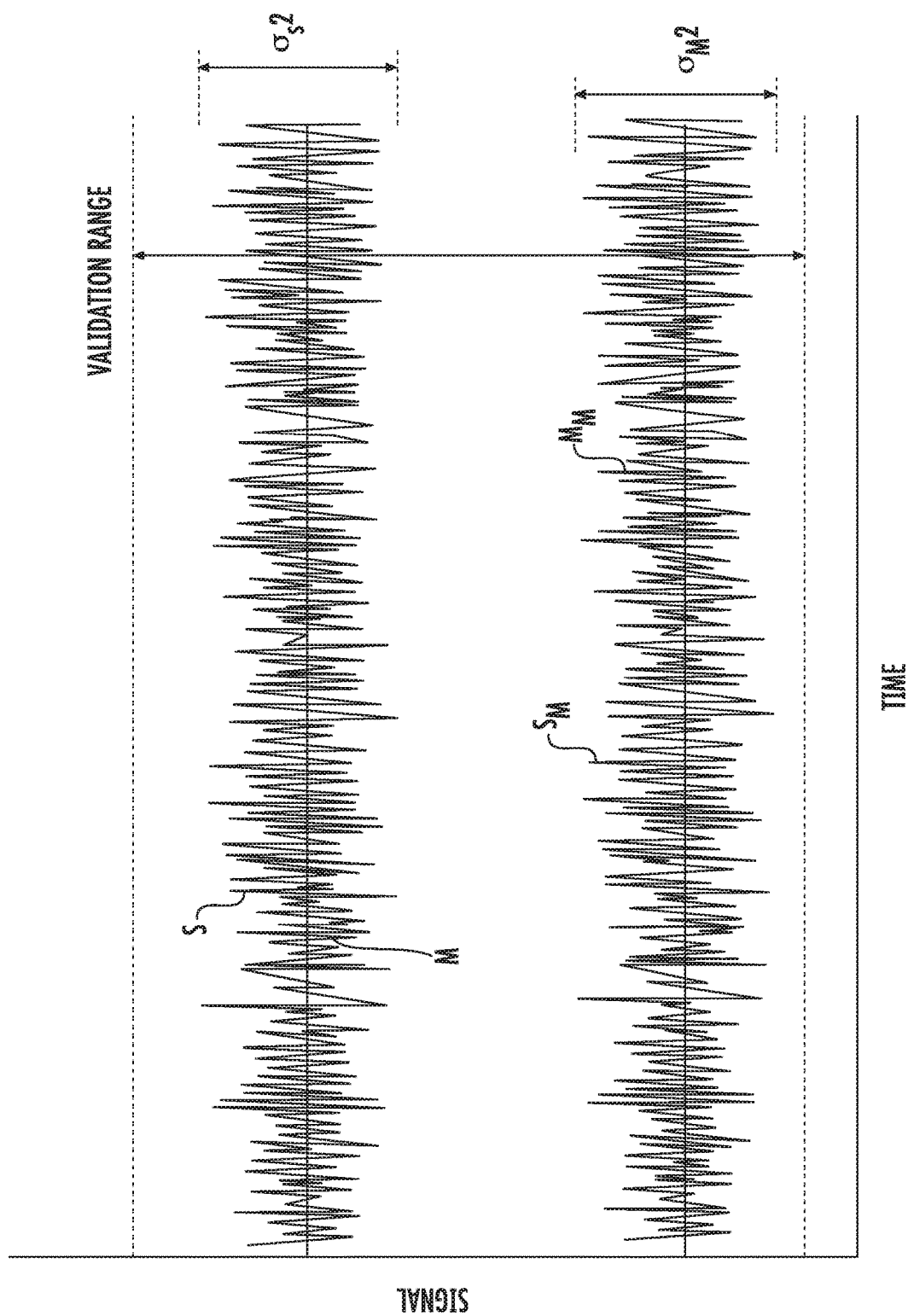
FIG. 5 provides a graph depicting a responsive signal as a function of time in accordance with an example embodiment of the present subject matter.

For instance, as shown in FIG. 5, the Mean M is calculated for a first signal S associated with a first period of time, e.g., 0.5 milliseconds. The one or more processing devices 122 can then calculate the variance $(\sigma_S)^2$ of the received signal S. Stated differently, the average squared deviation of each instantaneous reading from the mean of a data set is calculated for the signal S over the first period of time. For example, for each instantaneous reading (e.g., each peak and valley of the signal), the mean can be subtracted therefrom and squared, i.e., to determine the squared difference for each instantaneous reading. The variance $(\sigma_S)^2$ of the received signal S is the average of the squared differences from the Mean. As will be explained further below, the variance $(\sigma_S)^2$ of the received signal 140 can be used to determine whether the received signal S is unresponsive.

As further shown in FIG. 3, the computing device 120 includes one or more sensor model(s) 126. The sensor models 126 can include one or more embedded physics-based and/or cycle models, for example. In some embodiments, the sensor models 126 can include one or more machine-learned models. In FIG. 3, the one or more sensor model(s) 126 are represented by a single model. As will be explained in detail herein, the sensor model 126 is configured to output a predicted or expected variance $(\sigma_M)^2$. Stated differently, the sensor model 126 is configured to output an expected variance $(\sigma_M)^2$ of the signal 140 received from a given sensor. In some embodiments, the sensor model 126 can output an expected variance for each sensed signal that is utilized for controlling the turbine engine. That is, the one or more computing devices 120 can be monitor the response of each sensed control signal.

The sensor model 126 can output the expected variance $(\sigma_M)^2$ based at least in part on one or more received inputs. For instance, the sensor model 126 can receive one or more signals indicative of one or more operating conditions of the turbine engine during operation, e.g., from sensors 110, 112, 114, 116, 117, 118 (FIG. 2). The operating condition can be, without limitation, pressure, temperature, rotational speed, vibration, and/or fuel flow. The signals can be routed from one or more of the sensors 110, 112, 114, 116, 117, 118 to the computing device 120 via a suitable wired or wireless communication link. The sensor model 126 can then output the expected variance $(\sigma_M)^2$ based solely on the received inputs, e.g., in any suitable manner. Additionally or alternatively, the sensor model 126 can calculate one or more values (e.g., engine performance parameters) based at least in part on the received inputs and can use the calculated values in addition or alternatively to the received inputs to determine the expected variance $(\sigma_M)^2$. As will be explained further below, the determined variance $(\sigma_M)^2$ of the received signal 140 can be compared to the expected variance $(\sigma_M)^2$ to determine whether the received signal 140 is unresponsive.

Referring still to FIG. 3, the computing device 120 further includes control logic 128. As shown, the control logic 128 of the one or more processing devices 122 receives the determined variance $(\sigma_M)^2$ and the expected variance $(\sigma_M)^2$ associated with the received signal 140 and determines whether the signal 140 is unresponsive by comparing the determined variance $(\sigma_S)^2$ of the signal with the expected variance $(\sigma_M)^2$ of the signal. The control logic 128 of the one or more processing devices 122 is further configured to determine whether the determined variance ratio exceeds a predefined threshold. In such embodiments, if the determined variance ratio exceeds the predefined threshold, then the received signal is classified as unresponsive. If, however, the determined variance ratio does not exceed the predefined threshold, then the received signal is classified as responsive, or stated differently, not unresponsive. In some embodiments, the variance ratio is compared to multiple predefined thresholds.

In some embodiments, in determining whether the received signal is unresponsive by comparing the determined variance $(\sigma_S)^2$ of the signal with the expected variance $(\sigma_M)^2$, the one or more processing devices 122 are configured to determine a variance ratio based at least in part on the determined variance $(\sigma_S)^2$ of the signal and the expected variance $(\sigma_M)^2$ of the signal. In some embodiments, for example, the variance ratio can be defined as the ratio of determined variance $(\sigma_S)^2$ to expected variance $(\sigma_M)^2$, or vice versa. In yet other embodiments, the variance ratio can be defined by:

$$\log_{n^2+1} \frac{(\sigma_M)^2 + (n \times \sigma_S)^2}{(\sigma_M)^2} \qquad \text{(Ratio 1)}$$

wherein n is a signal amplifier, $\sigma_M$ is a standard deviation associated with the expected variance $(\sigma_M)^2$ of the signal, and $\sigma_S$ is a standard deviation associated with the variance $(\sigma_S)^2$ of the received signal. The standard deviation $\sigma_M$ squared is the expected variance $(\sigma_M)^2$ and the standard deviation $\sigma_S$ squared is the determined variance $(\sigma_S)^2$. For Ratio 1, the standard deviation $\sigma_S$ of the received signal is amplified by n to ensure that the control logic 128 of the one or more computing devices 120 has ample margin against false detection, e.g., so that signals that are actually responsive are not inadvertently classified as unresponsive. The amplifier n can be set as any suitable number to ensure the desired margin, such as e.g., applying a three-sigma rule.

To determine the variance ratio utilizing Ratio 1, the one or more computing devices 120 can input the variance of the signal $(\sigma_S)^2$ and the expected variance of the signal $(\sigma_M)^2$ into Ratio 1. The preselected amplifier n can also be input into Ratio 1 to amplify the standard deviation $\sigma_S$ of the received signal, e.g., to ample margin against false detection. Once the variance ratio is determined, the one or more computing devices 120 can determine whether the determined variance ratio exceeds a predefined threshold.

Figure 4:
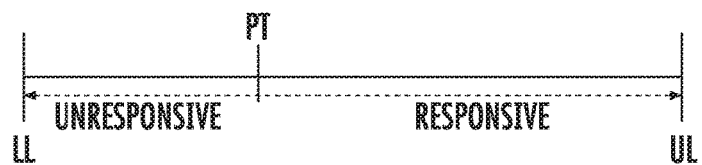
FIG. 4 provides a schematic view of a sliding scale in accordance with an example embodiment of the present subject matter.

For instance, with reference to FIG. 4, the predefined threshold PT can be defined as a value between the lower limit LL and the upper limit UL of possible outputs of the variance ratio (e.g., Ratio 1). The lower limit LL can be zero (0) and the upper limit UL can be any suitable number, e.g., one (1). For this example, the lower limit LL is zero (0), the upper limit UL is one (1), and the predefined threshold PT is set at 0.3. Nominally, the variance ratio is close to one (1) as the determined variance $(\sigma_S)^2$ of the signal and the expected variance $(\sigma_M)^2$ of the signal have similar levels of variance when the sensor signal is responsive. However, as shown, when the output of the variance ratio (e.g., Ratio 1) exceeds the predefined threshold PT, or in this example, if the output of the variance ratio is less than the predefined threshold PT, then the received signal is classified as unresponsive. For example, if the output of Ratio 1 is 0.2, then the signal is classified as unresponsive as 0.2 is less than the predefined threshold PT set at 0.3. As another example, if the output of Ratio 1 is 0.9, then the signal is classified as responsive as 0.9 is greater than the predefined threshold PT set at 0.3.

In some embodiments, the predefined threshold PT can be variable or adjustable, e.g., depending on one or more conditions. For instance, in some embodiments, the predefined threshold PT can be varied based at least in part on the operating state of the turbine engine. As one example, the operating state of the turbine engine can be a flight state or mode in which the turbine engine is operating, e.g., takeoff, cruise, descent, idle, etc. As another example, additionally or alternatively, the operating state can be associated with a health state of the turbine engine. For instance, the health state can be determined by the number of hours the turbine engine has been in service, a prognostic health monitoring model (PHM) of the engine operable to determine the deterioration of the engine based on how the engine has actually been operated for past missions, or some other method, system, or model for determining the health status of the engine.

In some embodiments, the one or more computing devices 120 can receive one or more inputs indicative of an operating state of the turbine engine. For instance, as noted above, the input can be indicative of a flight state or mode in which the turbine engine is operating. The input can be received by the one or more computing devices from a flight management system of an aircraft to which the turbine engine is mounted, for example. Additionally or alternatively, the input can be indicative of a health state of the turbine engine. The input can be received by the one or more computing devices 120 from a PHM model, for example.

Moreover, in such embodiments, the one or more computing devices 120 can determine the operating state of the turbine engine based at least in part on the received one or more inputs indicative of the operating state of the turbine engine. Thus, the operating state of the turbine engine can be determined. Moreover, the one or more computing devices 120 can adjust the predefined threshold based at least in part on the determined operating state of the of the turbine engine. For example, with reference to FIG. 4, the predefined threshold PT can be moved along the sliding scale toward the lower limit LL or toward the upper limit UP depending on the determined operating state of the turbine engine.

As one example, if the operating state of the turbine engine is determined as a takeoff state, then the predefined threshold PT can be set at 0.1. On the other hand, if the operating state of the turbine engine is determined as a cruise state, then the predefined threshold PT can be adjusted to 0.05. As yet another example, if the operating state of the turbine engine is determined as having a first health state, then the predefined threshold PT can be set at 0.03. On the other hand, if the operating state of the turbine engine is determined as having a second health state, wherein the turbine engine has more deterioration in the second health state than the first health state, then the predefined threshold PT can be adjusted to 0.06 to account for the engine deterioration. In yet further implementations, the predefined threshold PT can be fixed, e.g., at 0.3, 0.1, 0.05, etc.

Moreover, in some embodiments, a hysteresis band can be applied around the predefined threshold PT to prevent incorrect "healing" or correction of a signal that is only unresponsive for an instant. In this way, if the variance ratio exceeds the predefined threshold PT for only an instant and then immediately does not exceed the predefined threshold PT, the hysteresis band around the predefined threshold PT can prevent the system from taking corrective action, e.g., until the variance ratio exceeds the predefined threshold PT for a predetermined time and/or if the variance ratio exceeds the predefined threshold PT by a predetermined margin.

The one or more processing devices 122 are also configured to generate a control action in response to whether the signal is unresponsive, the control action being associated with controlling the turbine engine. If the received signal 140 is determined to be unresponsive, in generating the control action, the one or more processing devices 122 are configured to discard the received signal and control the turbine engine based at least in part on a secondary control input instead of the signal determined to be unresponsive. In contrast, if the received signal 140 is determined to be responsive, in generating the control action, the one or more processing devices 122 are configured to control the turbine engine based at least in part on the signal determined to be responsive.

For instance, with reference to FIG. 3, after the control logic 128 of the one or more computing devices 120 determines whether the signal is unresponsive, the one or more computing devices 120 can output or generate one or more control commands 146 indicative of instructions for controlling/adjusting one or more of the engine systems 95 of the engine. The one or more engine systems 95 can include, without limitation, one or more variable geometry components 86 (FIG. 2), fuel metering device 92 of fuel system 90 (FIG. 2), fan 38 (FIG. 2), and/or bleed valves 88 (FIG. 2) of the engine. The one or more control commands 146 can be routed to the one or more engine systems 95.

If the received signal is determined to be responsive, then the control commands 146 can be generated based at least in part on the healthy, responsive signal received. For example, if a signal indicative of the compressor discharge pressure (commonly referred to as P3) is received from high bandwidth, high frequency pressure sensor 112 and determined to be responsive, then the one or more control commands 146 indicative of instructions for controlling the fuel metering device 92 to control the flow of fuel to the combustor 26 can be generated based at least in part on the received signal.

If the received signal is determined to be unresponsive, then the one or more computing devices 120 can discard the unhealthy, unresponsive signal and the one or more computing devices 120 can utilize a secondary control signal to generate the control commands 146. The secondary control signal can be the model signal output by the sensor model 126, another or second signal received from a second sensor (e.g., another pressure sensor), or some other sensed, calculated, or predicted signal. For example, if a signal indicative of the compressor discharge pressure is received from a first sensor, e.g., high bandwidth, high frequency pressure sensor 112, and the signal is determined as unresponsive, then the one or more computing devices 120 can discard the unresponsive pressure signal and the one or more computing devices 120 can substitute the unresponsive signal with a secondary control signal (e.g., a model signal output by the sensor model 126) to generate the control commands 146 indicative of instructions for controlling the fuel metering device 92 to control the flow of fuel to the combustor 26. By detecting the unresponsive signal, discarding the unresponsive signal, and utilizing an alternative or secondary control signal to generate the control commands 146 for controlling the turbine engine, a loss of thrust or power control event can be prevented, among other benefits.

As noted previously, a number of advantages and benefits are achieved by use of the signal response monitoring scheme of the present disclosure. Notably, the control system 100 of the present disclosure proactively isolates unresponsive signals by comparing the variance of a received signal with an expected variance, e.g., output by a sensor model. As such, the control scheme of the present disclosure does not rely on model accuracy. This is beneficial for a number of reasons, as described previously. Furthermore, throttle maneuvers or adjustments are not required to determine whether the received signal is unresponsive. This is critical in the cruise phase of flight where throttle adjustments are minimal over an extended period of time. With the control scheme of the present disclosure, unresponsive signals can be determined without need to adjust the throttle.

Figure 6:
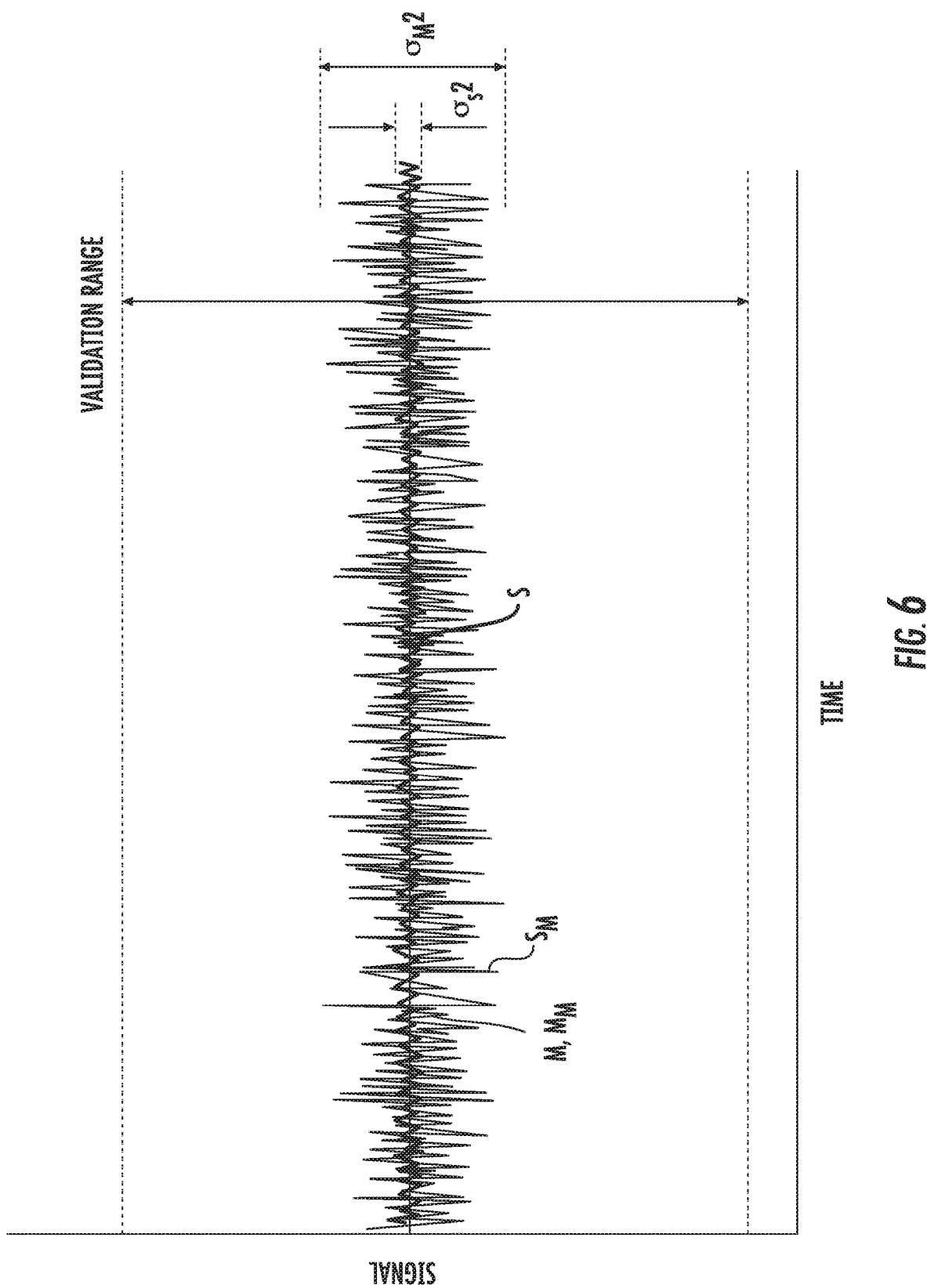
FIG. 6 provides a graph depicting an unresponsive signal as a function of time in accordance with an example embodiment of the present subject matter.

FIGS. 5 and 6 highlight the advantages of the signal response control scheme utilized by the control system 100 of the present disclosure. In FIG. 5, a received sensed signal S is shown over a first period of time and a model signal $S_M$ output by a sensor model (e.g., sensor model 126 of FIG. 3) is likewise shown over the first period of time. The mean M and the variance $(\sigma_S)^2$ are calculated for the received sensed signal S. The mean $M_M$ and the expected variance $(\sigma_M)^2$ are calculated for the model signal $S_M$. Notably, when the variance $(\sigma_S)^2$ of the received sensed signal S and the expected variance $(\sigma_M)^2$ are compared via the variance ratio as described above, the absolute difference between the received signal S and the model signal $S_M$ (i.e., the signal error) is not taken into consideration; rather, only the power or variance of the signals are considered. In the example of FIG. 5, the variance $(\sigma_S)^2$ of the received sensed signal S and the expected variance $(\sigma_M)^2$ are similar, and thus, when the variance ratio is determined and compared to a predefined threshold, the received sensed signal S is classified as a responsive signal. Notably, it is not important that the model signal $S_M$ did not accurately predict the actual value of the operating condition (graphically depicted by the space between the received sensed signal S and the model signal $S_M$), just that the power or variance $(\sigma_M)^2$ of the model signal $S_M$ was accurately predicted in real time, which is within the capability of current industry models. Accordingly, as noted above, the accuracy of the sensor model is not relied upon in determining whether the signal is responsive.

In FIG. 6, another advantage of the signal response control scheme utilized by the control system 100 of the present disclosure is presented. A received sensed signal S is shown over a second period of time and a model signal $S_M$ output by a sensor model (e.g., sensor model 126 of FIG. 3) is likewise shown over the second period of time. The mean M and the variance $(\sigma_S)^2$ are calculated for the received sensed signal S. The mean $M_M$ and the expected variance $(\sigma_M)^2$ are calculated for the model signal $S_M$. In this example, the received sensed signal S and the model signal $S_M$ each have the same mean. Thus, the mean M is equal to the mean $M_M$. In this example, as shown in FIG. 6, the received sensed signal S has failed or is unresponsive within its validation range. Particularly, the received sensed signal has frozen within its validation range. Thus, the failed signal S is not representative of the actual operating conditions of the turbine engine. In accordance with the signal response monitoring control scheme of the present disclosure, the received sensed signal S can still be detected when it is within its validation range and when the model signal $S_M$ appears to accurately represent the operating condition of the turbine engine as indicated by the received sensed signal (as shown by the overlapping sensed and modeled signals in FIG. 6). The received sensed signal can be determined as unresponsive even within its validation range and when it appears to accurately represent the operating conditions in the turbine engine by comparing the variances of the signals via the variance ratio and determining whether the output of the variance ratio exceeds a predefined threshold (as opposed to determining the absolute difference between the signals and then determining whether the difference exceeds a threshold).

Figure 7:
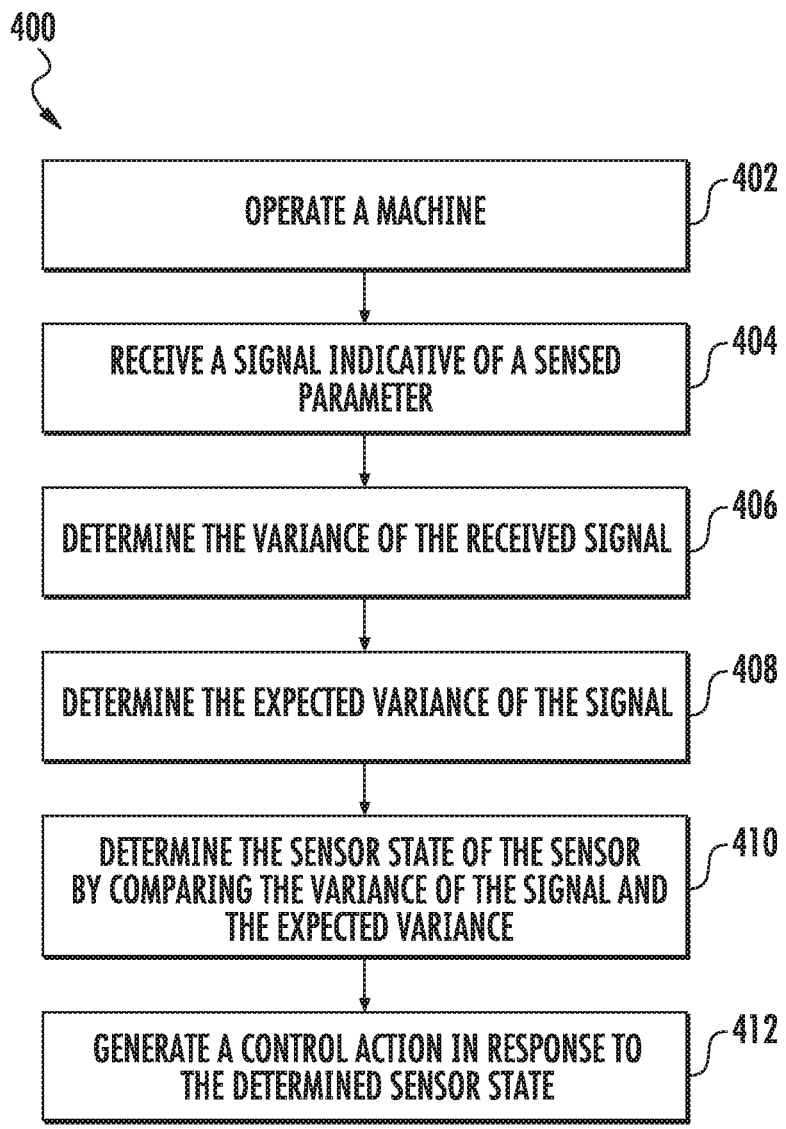
FIG. 7 provides a flow diagram of a method in accordance with an example embodiment of the present subject matter.

FIG. 7 provides a flow diagram of an exemplary method (400) for controlling a turbine engine in accordance with an embodiment of the present subject matter. For instance, the method (400) can be implemented to control the turbofan 10 of FIGS. 1 and 2. However, the method (400) can be implemented to control other types of engines as well, such as other types of turbine engines, steam turbine engines, reciprocating engines, as well as other turbomachinery. Some or all of the method (400) can be implemented by the control system 100 described herein. In addition, it will be appreciated that exemplary method (400) can be modified, adapted, expanded, rearranged and/or omitted in various ways without deviating from the scope of the present subject matter.

At (402), the method (400) includes operating a machine, such as e.g., a turbine engine. For instance, the turbine engine can be a gas turbine engine, such as e.g., the turbofan 10 of FIGS. 1 and 2. In other implementations, the gas turbine engine can be another suitable type of gas turbine engine, such as e.g., a turboprop, a turboshaft, a jet engine, an aeroderivative gas turbine engine, a marine gas turbine engine, etc. In yet other implementations, the turbine engine can be a different type of turbine engine, such as e.g., a steam turbine engine. In some further implementations, the machine can be any suitable type of machine.

At (404), the method (400) includes receiving, by one or more computing devices, a signal indicative of a sensed parameter from a sensor. The sensed parameter can be indicative of an operating condition of a turbine engine. For instance, the one or more computing devices can be the one or more computing devices 120 described herein. The one or more computing devices 120 can be positioned onboard the turbine engine, e.g., mounted under a cowling of the engine. The one or more computing devices 120 can receive the signal indicative of the operating condition of the engine from a senor. The signal can be received from a high bandwidth, high frequency sensor. The signal can be received as an analog signal or can be filtered and received as a digital signal. The frequency at which the sensors read the operating condition of the turbine engine (e.g., the compressor discharge pressure) can be on the order of two thousand times (2,000×) the update rate of the one or more computing devices 120. For example, with reference to FIG. 2, the one or more computing devices 120 can receive a signal from one of the sensors 110, 112, 114, 116, 117, 118 of the turbofan 10. The signal can be indicative of a sensed parameter, such as e.g., an operating condition of the turbine engine as noted above. The operating condition can be, without limitation, pressure, temperature, rotational speed, vibration, and/or fuel flow.

At (406), the method (400) includes determining, by the one or more computing devices, a variance of the signal based at least in part on the received signal. The variance of the signal received at (404) can be determined by the one or more computing devices 120 in any suitable manner.

At (408), the method (400) includes determining, by the one or more computing devices, an expected variance of the signal. For instance, before, during, or after the variance of the received signal is determined at (406), the one or more computing devices 120 can determine the expected variance of the signal. In some implementations, for example, an embedded model of the one or more computing devices 120 can determine and output the expected variance of the signal. The model can be a cycle deck physics-based model, a machine-learned model, some combination thereof, etc. For instance, the embedded model can be the physics-based sensor model 126 of FIG. 3.

The expected variance $(\sigma_M)^2$ can be determined and output by the sensor model 126 based at least in part on one or more received inputs. For instance, the sensor model 126 can receive one or more signals indicative of one or more sensed parameters (e.g., sensed parameters indicative of one or more operating conditions of a turbine engine during operation), e.g., from sensors 110, 112, 114, 116, 117, 118 (FIG. 2). The sensed parameters (e.g., operating conditions) can be, without limitation, pressure, temperature, rotational speed, vibration, and/or fuel flow. The signals can be routed from one or more of the sensors 110, 112, 114, 116, 117, 118 to the computing device 120 via a suitable wired or wireless communication link. Additionally, as shown in FIG. 3, the sensor model 126 can receive a commanded power 144 of the engine, e.g., a commanded thrust. The commanded power 144 can be based on a user input to a power input device, e.g., via pilot manipulation of a thrust or power lever 148 in a cockpit to which the turbine engine is mounted, or automatically, e.g., via an autonomous flight system. The sensor model 126 can output the expected variance $(\sigma_M)^2$ based solely on the received inputs, e.g., in any suitable manner. Additionally or alternatively, the sensor model 126 can calculate one or more values (e.g., engine performance parameters) based at least in part on the received inputs and can use the calculated values in addition or alternatively to the received inputs to determine the expected variance $(\sigma_M)^2$. Based on such inputs and/or calculated values, a model signal can be generated and the mean and the variance of the model signal (i.e., the expected variance) can be determined by the one or more computing devices 120 in any suitable manner.

At (410), the method (400) includes determining, by the one or more computing devices, the sensor state of the sensor by comparing the determined variance of the signal with the expected variance of the signal. The sensor state can be one of a responsive state and an unresponsive state. That is, once the variance $(\sigma_S)^2$ of the signal is determined at (406) and the expected variance $(\sigma_M)^2$ of the signal is determined or output at (408), the one or more computing devices 120 can compare the variance $(\sigma_S)^2$ of the signal 140 and the expected variance $(\sigma_M)^2$ of the signal 140 to determine whether the signal is unresponsive. If the signal is unresponsive, the sensor state is determined as being in the unresponsive state. On the other hand, if the signal is responsive, the sensor state is determined as being in the responsive state.

In some implementations, determining the sensor state of the sensor by comparing the determined variance of the signal with the expected variance of the signal comprises determining a variance ratio based at least in part on the determined variance of the signal and the expected variance of the signal; and determining whether the determined variance ratio exceeds a predefined threshold. In such implementations, if the determined variance ratio exceeds the predefined threshold, then the received signal is classified as unresponsive, and thus, the sensor state is determined as being in the unresponsive state. If, however, the determined variance ratio does not exceed the predefined threshold, then the received signal is classified as not unresponsive, and accordingly, the sensor state is determined as being in the responsive state.

By way of example, in some implementations, the variance ratio is defined by:

$$\log_{n^2+1} \frac{(\sigma_M)^2 + (n \times \sigma_S)^2}{(\sigma_M)^2}$$

(denoted previously as Ratio 1), wherein n is a signal amplifier, $\sigma_M$ is a standard deviation associated with the expected variance $(\sigma_M)^2$ of the signal, and $\sigma_S$ is a standard deviation associated with the variance $(\sigma_S)^2$ of the received signal. The standard deviation $\sigma_M$ squared is the expected variance $(\sigma_M)^2$ and the standard deviation $\sigma_S$ squared is the determined variance $(\sigma_S)^2$. For Ratio 1, the standard deviation $\sigma_S$ of the received signal is amplified by n to ensure that the control logic 128 of the one or more computing devices 120 has ample margin against false detection, e.g., so that signals that are actually responsive are not inadvertently classified as unresponsive. The amplifier n can be set as any suitable number to ensure the desired margin, such as applying a three-sigma rule. Further, in such implementations, nominally, the variance ratio is close to one (1) as the determined variance $(\sigma_S)^2$ of the signal and the expected variance $(\sigma_M)^2$ of the signal have similar levels of variance when the sensor signal is responsive.

Continuing with the example above, the one or more computing devices 120 can determine the variance ratio by inputting the variance of the signal $(\sigma_S)^2$ determined at (406) and the expected variance of the signal $(\sigma_M)^2$ determined at (408) into Ratio 1, which is the variance ratio in this example. The preselected amplifier n can also be input into Ratio 1 to amplify the variance of the signal $(\sigma_S)^2$, e.g., to ample margin against false detection. Once the variance ratio is determined, the one or more computing devices 120 can determine whether the determined variance ratio exceeds a predefined threshold.

For instance, with reference to FIG. 4, the predefined threshold PT can be defined as a value between the lower limit LL and the upper limit UL of possible outputs of the variance ratio (e.g., Ratio 1). The lower limit LL can be zero (0) and the upper limit UL can be any suitable number, e.g., one (1). For this example, the lower limit LL is zero (0), the upper limit UL is one (1), and the predefined threshold PT is set as 0.3. Nominally, the variance ratio is close to one (1) as the determined variance $(\sigma_S)^2$ of the signal and the expected variance $(\sigma_M)^2$ of the signal have similar levels of variance when the sensor signal is responsive. However, as shown, when the output of the variance ratio (e.g., Ratio 1) exceeds the predefined threshold PT, or in this example, if the output of the variance ratio is less than the predefined threshold PT, then the received signal is classified as unresponsive. For example, if the output of Ratio 1 is 0.2, then the signal is classified as unresponsive as 0.2 is less than the predefined threshold PT set at 0.3. As another example, if the output of Ratio 1 is 0.9, then the signal is classified as responsive as 0.9 is greater than the predefined threshold PT set at 0.3.

In some implementations, the predefined threshold PT can be variable, e.g., depending on one or more conditions. For instance, in some implementations, the predefined threshold PT can be varied based at least in part on the operating state of the turbine engine. As one example, the operating state of the turbine engine can be a flight state or mode in which the turbine engine is operating, e.g., takeoff, cruise, descent, idle, etc. As another example, additionally or alternatively, the operating state can be associated with a health state of the turbine engine. For instance, the health state can be determined by the number of hours the turbine engine has been in service, a prognostic health monitoring model (PHM) of the engine operable to determine the deterioration of the engine based on how the engine has actually been operated for past missions, or some other method, system, or model for determining the health status of the engine.

In some implementations, the method (400) includes receiving, by the one or more computing devices, one or more inputs indicative of an operating state of the turbine engine. For instance, as noted above, the input can be indicative of a flight state or mode in which the turbine engine is operating. The input can be received by the one or more computing devices from a flight management system of an aircraft to which the turbine engine is mounted, for example. Additionally or alternatively, the input can be indicative of a health state of the turbine engine. The input can be received by the one or more computing devices from a PHM model, for example. Moreover, in such implementations, the method (400) includes determining the operating state of the turbine engine based at least in part on the received one or more inputs indicative of the operating state of the turbine engine. Thus, the operating state of the turbine engine can be determined. Further, the method (400) includes adjusting the predefined threshold based at least in part on the determined operating state of the of the turbine engine. For example, with reference to FIG. 4, the predefined threshold PT can be moved along the sliding scale toward the lower limit LL or toward the upper limit UP depending on the determined operating state of the turbine engine.

As one example, if the operating state of the turbine engine is determined as a takeoff state, then the predefined threshold PT can be set at 0.1. On the other hand, if the operating state of the turbine engine is determined as a cruise state, then the predefined threshold PT can be adjusted to 0.05. As yet another example, if the operating state of the turbine engine is determined as having a first health state, then the predefined threshold PT can be set at 0.03. On the other hand, if the operating state of the turbine engine is determined as having a second health state, wherein the turbine engine has more deterioration in the second health state than the first health state, then the predefined threshold PT can be adjusted to 0.06 to account for the engine deterioration. In yet further implementations, the predefined threshold PT can be fixed, e.g., at 0.3, 0.1, 0.05, etc. Moreover, in some implementations, a hysteresis band can be applied around the predefined threshold PT to prevent incorrect "healing" or correction of a signal that is only unresponsive for an instant. In this way, if the variance ratio exceeds the predefined threshold PT for only an instant and then immediately does not exceed the predefined threshold PT, the hysteresis band around the predefined threshold PT can prevent the system from taking corrective action, e.g., until the variance ratio exceeds the predefined threshold PT for a predetermined time and/or if the variance ratio exceeds the predefined threshold PT by a predetermined margin.

At (412), after determining whether the received signal is unresponsive at (410), the method (400) includes generating, by the one or more computing devices, a control action in response to the determined sensor state. For instance, if the received signal is determined as unresponsive at (410) and thus the sensor state of the sensor is determined as being in the unresponsive state, generating, by the one or more computing devices, the control action at (412) comprises discarding the received signal and controlling the machine (e.g., a turbine engine) based at least in part on a secondary control input instead of the signal determined to be unresponsive at (410). In contrast, if the received signal is determined as responsive at (410) and thus the sensor state of the sensor is determined as being in the responsive state, generating, by the one or more computing devices, the control action at (412) comprises controlling the machine (e.g., the turbine engine) based at least in part on the signal determined to be responsive at (410).

For example, with reference to FIG. 3, after the control logic 128 of the one or more computing devices 120 determine whether the signal is unresponsive at (410), the one or more computing devices 120 can output or generate one or more control commands 146 indicative of instruction for controlling/adjusting one or more of the engine systems 95 of the engine, e.g., as shown in FIG. 3. The one or more engine systems 95 can include, without limitation, one or more variable geometry components 86 (FIG. 2), fuel metering device 92 of fuel system 90 (FIG. 2), fan 38 (FIG. 2), and/or bleed valves 88 (FIG. 2) of the engine. The one or more control commands 146 can be routed to the one or more engine systems 95. If the signal is determined to be responsive at (410), then the control commands 146 are based at least in part on the healthy, responsive signal received at (404). For example, if a signal indicative of the compressor discharge pressure (commonly referred to as P3) is received from high bandwidth, high frequency pressure sensor 112 at (404) and determined as responsive at (410), then the one or more control commands 146 can be indicative of instructions for controlling the fuel metering device 92 to control the flow of fuel to the combustor 26, which ultimately controls the thrust output of the engine.

If the received signal is determined to be unresponsive at (410), then the one or more computing devices 120 discard the unhealthy, unresponsive signal and the one or more computing devices 120 then utilize a secondary control signal to generate the control commands 146. The secondary control signal can be the model signal output by the sensor model 126 (e.g., as determined at (408)), another or second signal received from a second sensor (e.g., another pressure sensor), or some other sensed, calculated, or predicted signal.

For example, if a signal indicative of the compressor discharge pressure (commonly referred to as P3) is received from high bandwidth, high frequency pressure sensor 112 at (404) and determined as unresponsive at (410), then the one or more computing devices 120 can discard the unresponsive pressure signal and the one or more computing devices 120 can substitute the unresponsive signal with a secondary control signal (e.g., a model signal output from sensor model 126) to generate the control commands 146 indicative of instructions for controlling the fuel metering device 92 to control the flow of fuel to the combustor 26. By detecting the unresponsive signal, discarding the unresponsive signal, and utilizing an alternative or secondary control signal to generate the control commands for controlling the turbine engine, a loss of thrust or power control event can be prevented.

It will be appreciated that the one or more computing devices 120 can continuously monitor sensed signals to determine whether such signals are unresponsive. Stated differently, the one or more computing devices 120 can receive a signal, e.g., from a sensor, and can iteratively determine whether the signal is unresponsive, e.g., in a manner described above. For instance, the one or more computing devices 120 can receive (e.g., from a sensor) a signal indicative of an operating condition of the engine over a first period of time. The one or more computing devices 120 can then determine whether the signal indicative of the operating condition of the engine over the first period of time is unresponsive. Then, to confirm the signal is unresponsive or to continue monitoring the signal, the one or more computing devices 120 can receive (e.g., from the same sensor) a signal indicative of an operating condition of the engine over a second period of time. The second period of time can be a successive period of time relative to the first period of time or can be spaced from the first period of time. The one or more computing devices 120 can then determine whether the signal indicative of the operating condition of the engine over the second period of time is unresponsive. The one or more computing devices 120 can continue to monitor the signal for other periods of time, e.g., successive third, fourth, fifth, etc. periods of time in a manner described above.

In some implementations, if the signal is classified as unresponsive for a predetermined number of periods of time, then one or more computing devices 120 can cease monitoring the unresponsive signal and can set a failure flag, e.g., to notify maintenance or service crews that the sensor or some communication link therebetween has malfunctioned or is in need of repair. In some implementations, the one or more computing devices 120 cease monitoring the unresponsive signal and set a failure flag only if the signal is classified as unresponsive for a predetermined number of consecutive periods of time. In yet other implementations, the one or more computing devices 120 cease monitoring the unresponsive signal and set a failure flag only if the signal is classified as unresponsive for a predetermined number of periods of time within a predefined time period, e.g., five seconds (5 s). Moreover, the one or more computing devices 120 can disregard such unresponsive signals and control the turbine engine using a secondary control signal as described above.

Figure 8:
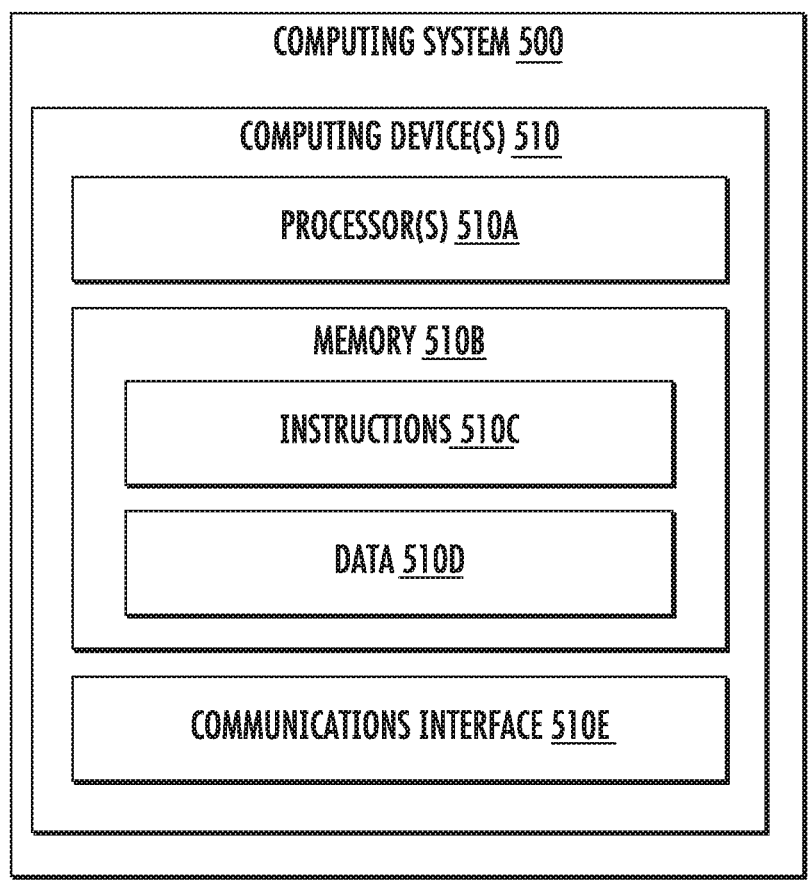
FIG. 8 provides an example computing system in accordance with an example embodiment of the present subject matter.

FIG. 8 provides an example computing system 500 according to example embodiments of the present disclosure. The one or more computing devices 120 described herein can include various components and perform various functions of the one or more computing devices of the computing system 500 described below, for example.

As shown in FIG. 8, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as e.g., operations for signal monitoring and/or controlling an engine as described herein. For instance, the method (400) can be implemented in whole or in part by the computing system 500. Accordingly, the method (400) can be at least partially a computer-implemented method such that at least some of the steps of the method (400) are performed by one or more computing devices, such as the exemplary computing device(s) 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as remote computing system 200 (FIG. 2), can be configured to receive one or more commands or data from the computing device(s) 510 or provide one or more commands or data to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for detecting a sensor state, the control system comprising:
    a sensor; and
    one or more computing devices communicatively coupled with the sensor and having one or more memory devices and one or more processing devices, the one or more memory devices storing computer-readable instructions that can be executed by the one or more processing devices to perform operations, and in performing the operations, the one or more processing devices are configured to:
    receive, from the sensor, a signal indicative of a sensed parameter;
    determine a variance of the signal based at least in part on the received signal;
    determine the sensor state of the sensor by comparing the determined variance of the signal with an expected variance of the signal; and
    generate a control action in response to the determined sensor state, and
    wherein the control system is operable to control a machine, and wherein the sensor state is one of an unresponsive state and a responsive state, and wherein when the sensor state is determined as being in the unresponsive state, in generating the control action the one or more processing devices are configured to:
    discard the received signal; and
    control the machine based at least in part on a secondary control input instead of the signal from the sensor determined as being in the unresponsive state.

2. The control system of claim 1, wherein the sensor is a first sensor, and wherein the secondary control input is one of (i) a second signal received from a second sensor and (ii) a sensor model.

3. The control system of claim 1, wherein the one or more processing devices are configured to:
    receive one or more signals indicative of sensed parameters;
    determine, by a sensor model of the one or more computing devices, the expected variance of the signal based at least in part on the received one or more signals indicative of the sensed parameters.

4. The control system of claim 3, wherein the one or more processing devices are configured to:
    receive an input indicating a commanded power of the machine, and
    wherein the sensor model of the one or more computing devices determines the expected variance of the signal based at least in part on the received one or more signals indicative of the sensed parameters and the input indicating the commanded power of the machine.

5. The control system of claim 1, wherein in determining the sensor state of the signal by comparing the determined variance of the signal with the expected variance of the signal, the one or more processing devices are configured to:
    determine a variance ratio based at least in part on the determined variance of the signal and the expected variance of the signal; and
    determine whether the determined variance ratio exceeds a predefined threshold, and
    wherein when the determined variance ratio exceeds the predefined threshold, then the received signal is classified as unresponsive and the sensor state is determined as being in the unresponsive state, and when the determined variance ratio does not exceed the predefined threshold, then the received signal is classified as responsive and the sensor state is determined as being in the responsive state.

6. The control system of claim 5, wherein the variance ratio is defined by:

$$\log_{n^2+1} \frac{(\sigma_M)^2 + (n \times \sigma_S)^2}{(\sigma_M)^2},$$

wherein n is a signal amplifier, $\sigma_M$ is a standard deviation associated with the expected variance of the signal, and $\sigma_S$ is a standard deviation associated with the variance of the signal.

7. The control system of claim 5, wherein the predefined threshold is variable.

8. The control system of claim 7, wherein the control system is operable to control a machine, and wherein the one or more processing devices are configured to:
    receive one or more inputs indicative of an operating state of the machine;
    determine the operating state of the machine based at least in part on the received one or more inputs indicative of the operating state of the machine; and
    adjust the predefined threshold based at least in part on the determined operating state of the of the machine.

9. The control system of claim 8, wherein the operating state of the machine is associated with a health state of the machine.

10. The control system of claim 8, wherein the machine is a gas turbine engine, and wherein the gas turbine engine is mounted to an aerial vehicle, and wherein the operating state of the gas turbine engine is associated with a flight state of the gas turbine engine.

11. The control system of claim 10, wherein the operating state of the gas turbine engine is at least one of a pressure and a temperature.

12. A method of detecting a sensor state of a sensor, the method comprising:
receiving, by one or more computing devices, a signal indicative of a sensed parameter from the sensor;
determining, by the one or more computing devices, a variance of the signal based at least in part on the received signal;
determining, by the one or more computing devices, the sensor state of the sensor by comparing the determined variance of the signal with an expected variance of the signal;
generating, by the one or more computing devices, a control action in response to the determined sensor state of the sensor, and
wherein the sensor state is one of an unresponsive state and a responsive state, and wherein, when the sensor state is determined as being the unresponsive state, generating, by the one or more computing devices, the control action comprises:
discarding the received signal; and
controlling a machine based at least in part on a secondary control input instead of the received signal.

13. The method of claim 12, wherein, when the sensor state is determined as being the responsive state, generating, by the one or more computing devices, the control action comprises:
controlling the machine based at least in part on the received signal.

14. The method of claim 12, wherein determining the sensor state of the sensor by comparing the determined variance of the signal with the expected variance of the signal comprises:
determining a variance ratio based at least in part on the determined variance of the signal and the expected variance of the signal; and
determining whether the determined variance ratio exceeds a predefined threshold, and
wherein when the determined variance ratio exceeds the predefined threshold, then the received signal is classified as unresponsive and the sensor state is determined as being the unresponsive state, and when the determined variance ratio is below the predefined threshold, then the received signal is classified as responsive and the sensor state is determined as being the responsive state.

15. The method of claim 14, wherein the variance ratio is defined by:

$$\log_{n^2+1} \frac{(\sigma_M)^2 + (n \times \sigma_S)^2}{(\sigma_M)^2},$$

wherein n is a signal amplifier, $\sigma_M$ is a standard deviation associated with the expected variance of the signal, and $\sigma_S$ is a standard deviation associated with the variance of the signal.

16. The method of claim 12, wherein the machine is a gas turbine engine.

17. A method for controlling a turbomachine, comprising:
receiving, by one or more computing devices, a signal;
determining, by the one or more computing devices, a variance of the signal based at least in part on the received signal;
determining, by the one or more computing devices, whether the signal is unresponsive by comparing the determined variance of the signal with an expected variance of the signal, and wherein determining whether the signal is unresponsive by comparing the determined variance of the signal with the expected variance of the signal comprises determining a variance ratio based at least in part on the determined variance of the signal and the expected variance of the signal and determining whether the determined variance ratio exceeds a predefined threshold; and
generating, by the one or more computing devices, an output indicative of whether the received signal is unresponsive, and wherein when the determined variance ratio exceeds the predefined threshold, the output generated by the one or more computing devices indicates that the received signal is unresponsive, and when the determined variance ratio does not exceed the predefined threshold, the output generated by the one or more computing devices indicates that the received signal is responsive.

18. The method of claim 17, wherein the variance ratio is defined by:

$$\log_{n^2+1} \frac{(\sigma_M)^2 + (n \times \sigma_S)^2}{(\sigma_M)^2},$$

wherein n is a signal amplifier, $\sigma_M$ is a standard deviation associated with the expected variance of the signal, and $\sigma_S$ is a standard deviation associated with the variance of the signal.

19. The method of claim 17, wherein the predefined threshold is variable based at least in part on an operating state of the turbomachine.

20. The method of claim 17, wherein the turbomachine is a gas turbine engine.

* * * * *